United States Patent [19]
Baba et al.

[11] Patent Number: 5,472,471
[45] Date of Patent: Dec. 5, 1995

[54] PROCESS FOR THE PRODUCTION OF AN OPTICAL FIBER BUNDLE FOR HEAT RESISTANCE AND VACUUM RESISTANCE BY BONDING FIBER ENDS WITH A BONDING GLASS

[75] Inventors: Nobuyoshi Baba, Nangou; Shinobu Nagahama, Kasukabe; Koji Moriya; Junya Yamauchi, both of Tajima, all of Japan

[73] Assignee: Sumita Optical Glass, Inc., Tokyo, Japan

[21] Appl. No.: 332,044

[22] Filed: Nov. 1, 1994

Related U.S. Application Data

[63] Continuation-in-part of Ser. No. 953,885, Sep. 30, 1992, abandoned.

[30] Foreign Application Priority Data

Oct. 18, 1991 [JP] Japan ................................ 3-271132

[51] Int. Cl.$^6$ ............................................. C03B 23/20
[52] U.S. Cl. .................... 65/409; 65/410; 65/33.5; 65/59.34; 65/59.4; 65/48; 501/2; 501/10
[58] Field of Search ............................. 65/59.5, 59.6, 65/59.34, 45, 48, 33.5, 410, 409, 59.4; 501/2, 10

[56] References Cited

U.S. PATENT DOCUMENTS

| | | | |
|---|---|---|---|
| 3,004,368 | 10/1961 | Hicks | 65/4.2 |
| 3,088,835 | 5/1963 | Pirooz | 65/33.5 |
| 3,247,756 | 4/1966 | Siegmund . | |
| 3,253,896 | 5/1966 | Woodcock | 65/4.2 X |
| 3,279,902 | 10/1966 | Gardner | 65/409 |
| 3,387,959 | 6/1968 | Cole . | |
| 3,485,648 | 12/1969 | Bishop | 65/33.5 |
| 3,981,706 | 9/1976 | Strack | 65/410 |
| 4,512,791 | 4/1985 | Kyle | 65/33 X |
| 4,648,892 | 3/1987 | Kittrell et al. | 65/4.21 |
| 4,682,849 | 7/1987 | Kowata | 65/410 |
| 4,983,195 | 1/1991 | Nolan | 65/110 |
| 5,045,100 | 9/1991 | Smith | 65/410 |
| 5,183,489 | 2/1993 | Brehm et al. | 65/4.21 X |

Primary Examiner—James Engel
Assistant Examiner—John M. Hoffmann
Attorney, Agent, or Firm—Wenderoth, Lind & Ponack

[57] ABSTRACT

An optical fiber bundle for heat resistance and vacuum resistance which can be used even at a very high temperature or high vacuum is provided in economical manner. This is accomplished by a process for the production of an optical fiber bundle for heat resistance and vacuum resistance, which comprises making up optical fiber filaments each having a core part and a clad part into a bundle, closely fusion-bonding the end of the optical fiber bundle with a bonding glass and then subjecting the bonding glass to a crystallization treatment to increase the heat resistance.

5 Claims, 2 Drawing Sheets

PROCESS FOR THE PRODUCTION OF AN OPTICAL FIBER BUNDLE FOR HEAT RESISTANCE AND VACUUM RESISTANCE BY BONDING FIBER ENDS WITH A BONDING GLASS

This application is a continuation-in-part of now abandoned application Ser. No. 07/953,885, filed Sep. 30, 1992 now abandoned.

BACKGROUND OF THE INVENTION

1. Field of the Invention

This invention relates to a process for the production of an optical fiber bundle for heat resistance and vacuum resistance which can be used even at a very high temperature or high vacuum.

2. Description of the Prior Art

Using optical fiber filaments each having a core part and clad part, a number of these filaments are uniformly bundled for transmission of lights to prepare image guides or light guides in such a manner that the optical axes are properly arranged. These devices have wide appliances and are used as an endoscope for medical treatment, illumination means of a narrow space, light monitor, optical sensor, etc., which are important individual optical parts of optical devices, apparatus and other precision devices and apparatus. As such optical fiber bundles, there are used those respectively composed of a fixed part at the end part and a flexible part at the middle part.

The fixed part of the end part is formed by mainly fixing with an organic or inorganic adhesives, for example, by methods using organic adhesives as disclosed in Japanese Patent Laid-Open Publication Nos. 111908/1980 and 262105/1985 and using inorganic adhesives, in particularly, glasses as disclosed in Japanese Patent Laid-Open Publication Nos. 65907/1980 and 114804/1989.

flowever, the adhesives for fixing the end part of the optical fiber bundle, of the prior art, are not suitable for use at a higher temperature, since the heat resistance temperature of organic adhesives, for example, epoxy type resin adhesives is about 150° C. and that of polyimide type resin adhesives is about 300° C., as disclosed in the above described publications. Furthermore, even in use for vacuum resistance, the use of organic adhesives results in the problem that voids or pores are formed by the adhesive reaction process of the resin to lower the gas tightness and during evacuation, a gas is generated to lengthen the time for the evacuation.

When using inorganic adhesives, in particular, glasses, the gas tightness at bonded parts is good and no gas is generated, so that the adhesives of this type can well be applied to a use needing vacuum resistance. However, since the glass used as an adhesives is a low melting point glass, there arises the problem that the heat resistance temperature is also only about 300° C. similar to the organic adhesives and this adhesives cannot be applied to a use at a higher temperature.

Regarding this problem of heat resistance, there has been proposed a method comprising using a quartz-type optical fiber as an optical fiber filament and an organic binder, in which an inorganic component is dissolved, as an adhesives and thereby raising the heat resistance temperature employed to a very high temperature, e.g. 800° C.

However, this method has also the disadvantage that since in a bonding process, the organic component is removed by a heat treatment after the bonding, voids are also formed similarly to the case of using resin adhesives to lower the gas tightness and to decrease the bonding strength and thus bonded parts are brittle. In addition, owing to the use of the quartz-type optical fiber as an optical fiber filament, the production cost is very high.

Furthermore, as disclosed in the above described laid-open publication, it has been known to immerse the end of an optical fiber bundle in a low melting point glass, thus effecting fusion bonding. In this method, however, a large quantity of glass adheres to the end of the optical fiber bundle, expands and immediately solidifies, so that it is considerably difficult to draw the optical fiber bundle in, for example, a metallic tube for fixing the end part. The present invention has been made for the purpose of solving the problems of the prior art.

SUMMARY OF THE INVENTION

It is an object of the present invention to provide a process for the production of an optical fiber bundle for heat resistance and vacuum resistance, having both the gas tightness and heat resistance, at a high temperature, of the end of the optical fiber bundle.

It is another object of the present invention to provide a method of bonding the end of an optical fiber bundle with a bonding glass.

These objects can be attained by a process for the production of an optical fiber bundle for heat resistance and vacuum resistance, which comprises making up optical fiber filaments each having a core part and a clad part into a bundle, tightly fusion-bonding the end of the optical fiber bundle with a bonding glass and then subjecting the bonding glass to a crystallization treatment to increase the heat resistance.

BRIEF DESCRIPTION OF THE DRAWINGS

The accompanying drawings are to illustrate the principle and merits of the present invention in detail.

DETAILED DESCRIPTION OF THE INVENTION

Figure 1:
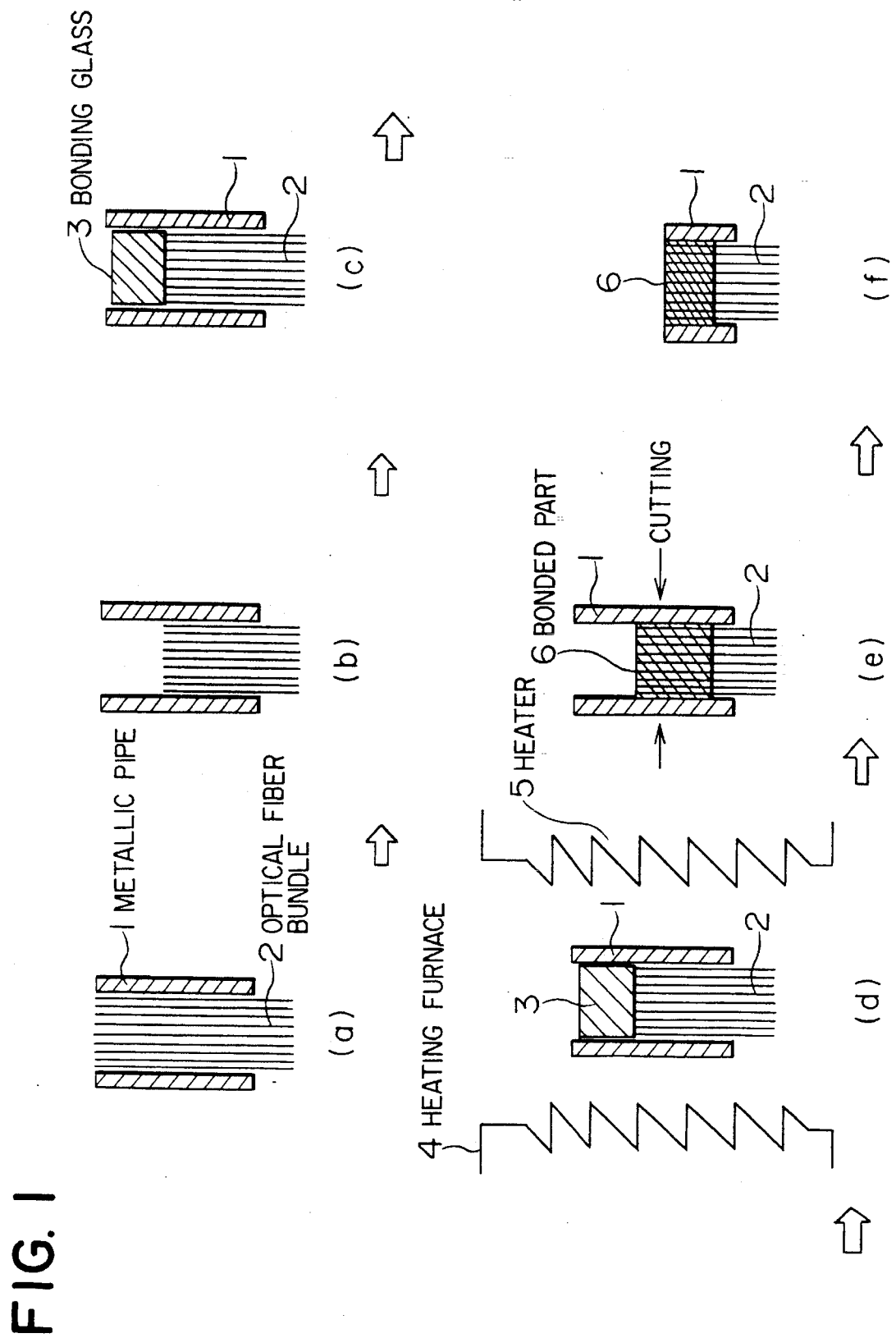
FIG. 1 is a schematic view of one embodiment of the present invention in the order of steps.

In the present invention, the above described fusion bonding with a bonding glass is generally carried out by placing the bonding glass on the end of the optical fiber bundle, heating them under this state and thereby diffusing and permeating the bonding glass through the optical fiber bundle.

In the present invention, the optical fiber filament having a core part and a clad part preferably consists of a glass composition having a glass transition temperature (Tg) of higher than 500° C. and a softening temperature (Ts) of higher than 700° C.

As the above described bonding glass in the present invention, there can preferably be used a glass composition which is fusion-bonded at a temperature of at most 700° C. and well crystallized at a temperature of 500° to 700° C., and has a sag temperature (At) of at least 400° C.

The specific glass composition of the bonding glass having the above described characteristics comprises 20.0 to 30.0 weight % of $TeO_2$, 12.0 to 30.0 weight % of $Bi_2O_3$, 13.0 to 23.0 weight % of $GeO_2$. 15.0 to 35.0 weight % of PbO, 0 to 12.0 weight % of $La_2O_3$ and 0 to 20.0 weight % of $Nb_2O_5$, provided that the sum of the amounts of $La_2O_3$ and $Nb_2O_5$ is in the range of 5.0 to 20.0 weight %, in which a part of the above described components can be replaced by at least one oxide component selected from the group consisting of Li, Na, K, Cs, Mg, Ca, Zn, St, Ba, Ti, Y, Zr, Ca, In, Sn, Sb, Tl, As, Al, Gd, Yb, Ta, W and P oxides in such a range that the glass composition is fusion-bonded at a temperature of at most 700° C. and well crystallized at a temperature of 500° to 700° C., and has a glass sag temperature (At) of at least 400° C.

The inventors have made various studies to overcome the disadvantages of the prior art and consequently, have reached such a consideration that an optical fiber bundle for heat resistance and vacuum resistance, bonded gas-tightly to be free from voids or pores, ran be obtained by using an optical fiber bundle which is free from deformation at the fusion-bonding temperature and can be used at a high temperature, e.g. 500° C., fusion-bonding the optical fiber bundle with a bonding glass which ran be fusion-bonded at a temperature of at most 700° C., used at a temperature of 500° C. and sufficiently permeated through the optical fiber bundle and then subjecting to crystallization. Based on this consideration, the composition of the bonding glass having such properties has been developed and the present invention can thus be accomplished.

As the optical fiber filament having a core part and a clad part, there is used a glass having a glass transition temperature (Tg) of higher than 500° C. and a glass softening temperature (Ts) of exceeding 700° C. This glass, having a glass transition temperature of higher than 500° C., can be protected from softening and deforming even at 500° C. and can resist a use at a high temperature, e.g. 500° C. for a long time. Since the fusion-bonding temperature of the bonding glass in the present invention does not exceed 700° C., an optical fiber filament, having a softening temperature (Ts) of exceeding 700° C., is not softened and deformed during the fusion-bonding.

In the present invention, any optical fiber filament capable of satisfying the above described properties can be used, for example, consisting of predominantly $SiO_2$ type glass, $SiO_2$-$B_2O_3$ type glass, $GeO_2$ type glass, $P_2O_5$ type glass with further several kinds of modifying oxides.

As the bonding glass characteristic of the present invention, there is used a glass that can well be fusion-bonded at a temperature of at most 700° C. to suppress deformation of optical fibers at the bonding temperature and that has a sag temperature (At) of at least 400° C. to achieve a heat resistance at 500° C. The reason therefor is that the heat resistance temperature of a glass ordinarily called "crystallized glass" is limited to the maximum treatment temperature during crystallizing treatment. In the present invention, a bonding glass well crystallizing at a temperature of exceeding 500° C. is used.

Since if the sag temperature (At) of the bonding glass is lower than 400° C., the crystallization treatment temperature is lower than 500° C., a glass having a sag temperature of at least 400° C. should be used.

Generally, an optical fiber having a core and a clad predominantly consists of $SiO_2$ type or $SiO_2$-$B_2O_3$ type glass composition, so when using a bonding glass of a same glass composition type, the optical fiber and bonding glass are fused into one during bonding and the bonding glass is hard to be permeated. As the composition of the bonding glass in the present invention, a $TeO_2$ type glass enriched in permeability and fusion-bonding property in an optical fiber bundle is preferable and in particular, a composition as exemplified below is preferable.

That is, such a glass has a composition comprising 20.0 to 30.0 weight % of $TeO_2$, 12.0 to 30.0 weight % of $Bi_2O_2$, 13.0 to 23.0 weight % of $GeO_2$, 15.0 to 35.0 weight % of PbO, 0 to 12 weight % of $La_2O_3$ and 0 to 20.0 weight % of $Nb_2O_5$ ($La_2O_3+Nb_2O_5$=5.0 to 20.0 weight %). In this composition, the grounds for limiting the scopes of the components are as follows:

$TeO_2$ is a characteristic component as the bonding glass of the present invention and functions to increase the permeability and fusion-bonding property during a bonding treatment of an optical fiber of $SiO_2$ type or $SiO_2$-$B_2O_3$ type and to compose the network of the glass. The amount of this component is preferably in the above described range, since if less than 20.0 weight %, the glass is very unstable, while if more than 30.0 weight %, the aimed thermal property cannot be attained.

$Bi_2O_3$ is a component for composing a glass network similar to $TeO_2$ and an effective component for lowering the melting point of the glass. However, if the amount of $Bi_2O_3$ is less than 12.0 weight %, the glass is unstable, while if more than 30.0 weight %, the sag temperature (At) of the glass is lowered. Thus, the above described range is preferable.

$GeO_2$ is a component for composing a glass network with $TeO_2$ and $Bi_2O_3$. The amount of this component is preferably in the above described range, since if less than 13.0 weight %, the glass is unstable, while if more than 23.0 weight %, the chemical durability is deteriorated.

PbO is an effective component for lowering the melting point of the glass. The amount of this component is preferably in the above described range, since if less than 15.0 weight %, the effect thereof is little, while if more than 35.0 weight %, the permeability and fusion-bonding property during a bonding treatment are deteriorated.

$La_2O_3$ is an effective component for improving the chemical durability of the glass and raising the crystallization treatment temperature. However, if the amount thereof is more than 12.0 weight %, no glass is obtained.

$Nb_2O_5$ has the similar properties to $La_2O_3$. If the amount thereof is more than 12.0 weight %, no glass is obtained.

However, the sum of $La_2O_3+Nb_2O_5$ should be 5.0 to 20.0 weight %, since if less than 5.0 weight %, a sag temperature of at least 400° C. cannot be obtained, while if more than 20.0 weight %, no glass can be obtained.

A part of the above described components can be replaced with at least one oxide selected from the group consisting of oxides of Li, Na, K, Cs, Mg, Ca, Zn, St, Ba, Ti, Y, Zr, Ga, In, Sn, Sb, Tl, As, Al, Gd, Yb, Ta, W and P in such a range that the fusion-bonding takes place at a temperature of at most 700° C., good crystallization takes place at a temperature of 500° to 700° C. and the sag temperature (At) is in the range of at least 400° C.

In the present invention, an optical fiber bundle of optical fiber filaments is fusion-bonded with a bonding glass, as described above, and then the bonding glass is subjected to crystallization. Thus, the advantage can be obtained that a heat resistance at a high temperature is given by not only fusion-bonding but also crystallizing to a fusion-bonded part having attained only a heat resistance up to the glass transition temperature (Tg) as it stands as glass. That is, in the present invention, a heat resistance at a high temperature, e.g. 100° C. higher than the glass transition temperature (Tg) of the bonding glass is given by a crystallization treatment.

The fusion-bonding in the present invention should preferably be carried out at a temperature of at most 700° C. so as to prevent an optical fiber bundle from softening and deforming. As a specific means, there is proposed a method comprising placing a bonding glass on an optical fiber bundle, heating them under such a state from the outside and utilizing permeation of the bonding glass through the optical fiber bundle by its weight.

Furthermore, the crystallization in the present invention should preferably be carried out at a temperature of 500° to 700° C. so as to give a heat resistance at 500° fiber bundle from softening and deforming, at which the bonding glass is optimumly crystallized.

Referring to the accompanying drawings, the process of the present invention will now be illustrated in more detail. As shown in FIG. 1 (a), a bundle of optical fiber filaments is inserted in a metallic pipe 1 and the end part of the optical fiber bundle outside the pipe 1 is cut to make the end surface even in a plane. Then, the optical fiber bundle 2 is withdrawn from the metallic pipe with such a sufficient length that a bonding glass 3 can be placed, as shown in FIG. 1 (b), the bonding glass 3 is placed thereon as shown in FIG. 1 (c) and the assembly is then set in a heating furnace 4, as shown in FIG. 1 (d). The assembly is heated at a temperature of at most 700° C. for a constant time by means of a heater 5 and the bonding glass 3 is permeated through the optical fiber bundle 2 and fusion-bonded. The furnace temperature is then lowered to a temperature of 500° to 700° C. and maintained for a constant time, thereby crystallizing the bonding glass permeated through the optical fiber bundle. After this crystallization treatment, the assembly is gradually cooled to a further lower temperature, e.g. about 200° C. and taken out of the heating part. As shown in FIG. 1 (e), the fixed part of the optical fiber bundle, fixed by the resulting bonded part 6, is partially cut at an arrow part and the cut surface is optically polished to obtain an optical guide rod as shown in FIG. 1 (f).

Figure 2:
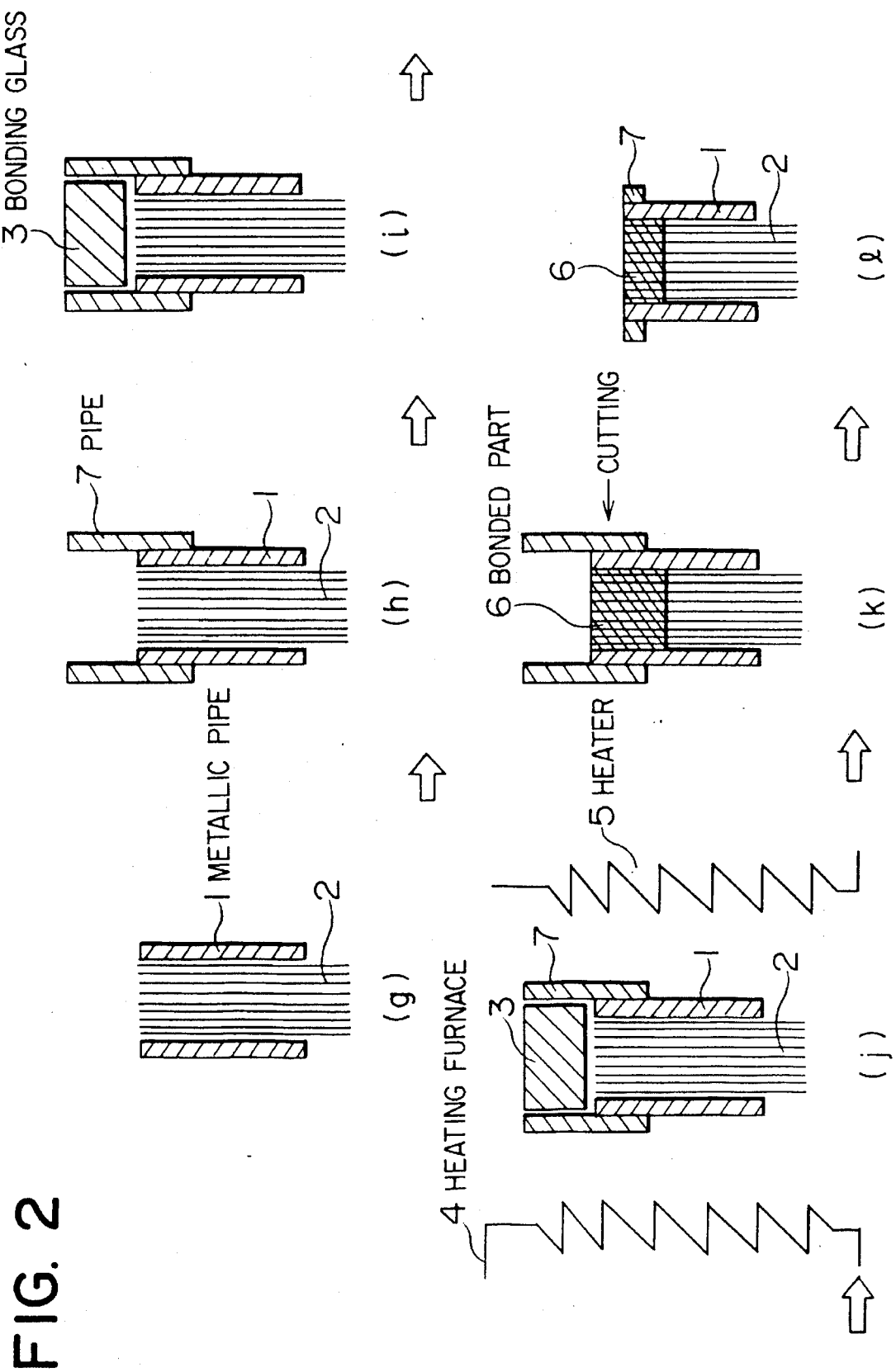
FIG. 2 is a schematic view of another embodiment of the present invention in the order of steps.

In FIG. 2, there is shown another production process of the present invention, in which (g) shows the same state as (a) of FIG. 1. As shown in FIG. 2 (h), the metallic pipe 1, filled with the bundle of the optical fiber filaments, is covered with a metallic pipe 7 being a size larger than the metallic pipe 1 and fixed to maintain a sufficient length enough to place the bonding glass 3. As shown in FIG. 2 (i), the bonding glass is placed on the upper part and then subjected to steps of (j) to (l) corresponding to the steps of (d) to (f) to obtain an optical guide rod. According to the process of FIG. 2, cutting of the periphery of the optical fiber bundle can be prevented and accordingly, an optical guide rod having a further excellent light transmission can be obtained.

The following examples are given in order to illustrate the present invention in detail without limiting the same.

EXAMPLE 1

Optical fiber filaments each consisting of a core having a composition of 34 weight % of $SiO_2$, 18 weight % of $B_2O_3$, 34 weight % of BaO and the balance of other micro amount components, a refractive index (nd) of 1.603, a glass softening temperature (Ts) of 750° C. and a glass transition temperature (Tg) of 623° C., and a clad having a composition of 57 weight % of $SiO_2$, 19 weight of $B_2O_3$, 5 weight % of $Al_2O_3$ and the balance of other micro amount components, a refractive index (nd) of 1.510, a glass softening temperature (Ts) of 739° C. and a glass transition temperature (Tg) of 559° C. were bundled, inserted, as a bundle 2, into a metallic pipe 1 consisting of YEF 29-17 (commercial name, manufactured by Hitachi Kinzoku KK, Fe-Ni-Co type alloy, expansion coefficient $[\alpha] \approx 50 \times 10^{-7}$) and the end part of the optical fiber bundle outside the pipe 1 was cut to make the end surface even in a plane. As shown in FIG. 1 (b), the arranged bundle 2 was withdrawn from the pipe, a bonding glass 3 having a composition and a characteristic value as shown in Table 1 was inserted in the upper part of the pipe (FIG. 1 (c)) and set in a heating furnace 4 as shown in FIG. 1 (d). The assembly was heated at 700° C. for 1 hour by means of a heater 5 to permeate the bonding glass through the optical fiber bundle 2 and fusion-bonded. The furnace temperature is then lowered to a temperature of 500° to 600° C. and maintianed for about 5 hours, thereby crystallizing the bonding glass permeated through the optical fiber bundle. After this crystallization treatment, the assembly is gradually cooled to about 200° C. and taken out of the heating part. The fixed part of the optical fiber bundle, fixed by the resulting bonded part 6, is partially cut at the bonded part and the cut surface is optically polished to obtain an optical guide rod as shown in FIG. 1 (e) to (f).

The thus prepared optical guide rod of the optical fiber bundle had an end structure excellent in gas tightness as well as heat resistance up to 500° C.

| Composition | Sample No. | | | | | | |
|---|---|---|---|---|---|---|---|
| | 1 | 2 | 3 | 4 | 5 | 6 | 7 |
| $TeO_2$ | 25.0 | 25.0 | 25.0 | 20.0 | 30.0 | 27.0 | 25.0 |
| $Bi_2O_3$ | 12.0 | 25.0 | 25.0 | 30.0 | 20.0 | 15.0 | 18.5 |
| $GeO_2$ | 18.0 | 18.0 | 18.0 | 18.0 | 18.0 | 23.0 | 18.0 |
| PbO | 35.0 | 24.0 | 17.0 | 27.0 | 20.0 | 15.0 | 28.5 |
| $La_2O_3$ | — | — | — | 5.0 | 12.0 | — | 5.0 |
| $Nb_2O_5$ | 10.0 | 8.0 | 15.0 | — | — | 20.0 | 5.0 |
| Property | | | | | | | |
| at (°C.) | 401 | 405 | 410 | 403 | 413 | 407 | 427 |

EXAMPLE 2

Using an optical fiber bundle having the same properties as in Example 1, an optical guide rod was prepared according to the process of the present invention as shown in FIG. 2. The optical fiber bundle ((g) of FIG. 2) prepared in the similar manner to Example 1 was inserted and fixed in a metallic pipe with a larger size ((h) of FIG. 2) and a bonding glass 3 was placed on the upper part of the fiber bundle ((i) of FIG. 2), followed by treating in the similar manner to Example 1 to obtain an optical guide rod.

The thus prepared optical guide rod of the optical fiber bundle had an end structure excellent in gas tightness as well as heat resistance up to 500° C. Since snapping of filaments at the periphery of the optical fiber bundle is suppressed according to the process of the present invention, there could be obtained the optical guide rod more excellent in light transmission than that of Example 1.

As is evident from the foregoing illustrations and examples of the present invention, a bonding glass is used for fixing the end of an optical fiber bundle and crystallized to improve the heat resistance in the present invention, thereby obtaining a high temperature heat resistance up to 500° C., and the end part is excellent in gas tightness and free from gas generation. Therefore, according to the present invention, it is possible to produce an optical guide rod of an optical fiber bundle having a high heat resistance and vacuum resistance, which can be applied to a use needing a heat resistance and vacuum resistance.

What is claimed is:

1. A process for the production of an optical fiber bundle which comprises assembling optical fiber filaments, each having a core and clad part, into a bundle, contacting the optical fiber bundle at an end thereof with a bonding glass. having a softening point lower than that of said optical fiber filaments, tightly fusion bonding the end of said optical fiber bundle with said bonding glass, and then subjecting said bonding glass to a crystallization treatment, said bonding glass having a glass composition comprising 20 to 30 weight % of $TeO_2$, 12 to 30 weight % of $Bi_2O_3$, 13 to 23 weight % of $GeO_2$, 15 to 35 weight % of PbO, 0 to 12 weight % of $La_2O_3$ and 0 to 20 weight % of $Nb_2O_5$, provided that the sum of the amounts of $La_2O_3$ and $Nb_2O_5$ is in the range of 5.0 to 20.0 weight % and optionally at least one oxide component selected from the group consisting of Li, Na, K, Cs, Mg, Ca, Zn, Sr, Ba, Ti, Y, Zr, Ga, In, Sn, Sb, Tl, As, Al, Gd, Yb, Ta, W and P oxides.

2. The process as claimed in claim 1, wherein the fusion-bonding with said bonding glass is carried out by heating the bonding glass to a temperature such that the bonding glass permeates throughout the end of the optical fiber binder and fusion-bonds the said end of the optical fiber bundle.

3. The process as claimed in claim 1, wherein the fusion-bonding is performed at a temperature of at most 700° C. and the glass crystallization is performed at a temperature of 500° to 700° C.

4. The process as in claim 1 wherein during the assembly the optical fiber bundle is held in a sleeve and during the contacting step the bonding glass is inserted into the sleeve so that it contacts the end of the optical fiber and wherein fusion-bonding of said optical fiber bundle is performed at temperatures such that the bonding glass fuses and permeates the end of said optical fiber bundle.

5. The process as in claim 4 wherein the sleeve is a metal sleeve.

* * * * *